US008357980B2

(12) United States Patent
Williams et al.

(10) Patent No.: US 8,357,980 B2
(45) Date of Patent: Jan. 22, 2013

(54) PLASMONIC HIGH-SPEED DEVICES FOR ENHANCING THE PERFORMANCE OF MICROELECTRONIC DEVICES

(75) Inventors: R. Stanley Williams, Portola Valley, CA (US); David Fattal, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1119 days.

(21) Appl. No.: 11/974,746

(22) Filed: Oct. 15, 2007

(65) Prior Publication Data

US 2009/0097798 A1 Apr. 16, 2009

(51) Int. Cl.
*H01L 27/14* (2006.01)
*H01L 31/101* (2006.01)

(52) U.S. Cl. ............ 257/414; 257/9; 257/431; 257/432; 257/462; 257/E31.001; 977/762; 977/766; 977/767; 977/768; 977/771

(58) Field of Classification Search .............. 257/9, 414, 257/431, 432, E31.001, 462; 977/762, 766, 977/768, 771, 767
See application file for complete search history.

(56) References Cited

U.S. PATENT DOCUMENTS

| 5,625,729 | A  | * | 4/1997 | Brown | 385/31 |
| 5,962,863 | A  | * | 10/1999 | Russell et al. | 257/14 |
| 6,462,950 | B1 | * | 10/2002 | Pohjonen | 361/704 |
| 6,759,305 | B2 | * | 7/2004 | Lee et al. | 438/399 |
| 7,101,740 | B2 | * | 9/2006 | Young | 438/158 |
| 7,161,168 | B2 | * | 1/2007 | Heath et al. | 257/9 |
| 7,416,993 | B2 | * | 8/2008 | Segal et al. | 438/742 |
| 2003/0128634 | A1 | * | 7/2003 | Challener | 369/13.33 |
| 2005/0181587 | A1 | * | 8/2005 | Duan et al. | 438/551 |
| 2006/0065989 | A1 | * | 3/2006 | Druffel et al. | 264/1.32 |
| 2006/0211183 | A1 | * | 9/2006 | Duan et al. | 438/149 |
| 2007/0194357 | A1 | * | 8/2007 | Oohashi et al. | 257/292 |
| 2007/0262405 | A1 | * | 11/2007 | Furuyama | 257/432 |
| 2008/0014689 | A1 | * | 1/2008 | Cleavelin et al. | 438/197 |
| 2009/0059371 | A1 | * | 3/2009 | Glembocki et al. | 359/529 |

FOREIGN PATENT DOCUMENTS

| JP | 2001-108612 A | 4/2001 |
| JP | 2007-248141 A | 9/2007 |
| KR | 10-2007-0004900 A | 1/2007 |

OTHER PUBLICATIONS

Bozhevolnyi et al. Nanophotonics with Surface Plasmons. P?hotonics Spectra, Jan. 2006, pp. 58-66 and Feb. 2006, pp. 66-72.*

(Continued)

*Primary Examiner* — Colleen Matthews
*Assistant Examiner* — Galina Yushina (57) ABSTRACT

Various embodiments of the present invention are directed to photonic devices that can be used to collect and convert incident ER into surface plasmons that can be used to enhance the operation of microelectronic devices. In one embodiment of the present invention, a photonic device comprises a dielectric layer having a top surface and a bottom surface, and a planar nanowire network covering at least a portion of the top surface of the dielectric layer. The bottom surface of the dielectric layer is positioned on the top surface of a substrate, and the planar nanowire network is configured to convert incident electromagnetic radiation into surface plasmons that penetrate through the dielectric layer and into at least a portion of the substrate.

9 Claims, 9 Drawing Sheets

OTHER PUBLICATIONS

Li et al. Patterned Metal Nanowire Arrays from Photolithographically-Modified Templates. J. Am. Chem. Soc. 2006, 128, pp. 13342-13343.*

Geissler et al. Fabrication of Metal nanowires Using Microcontact Printing. Langmuir 2003, 19, pp. 6301-6311.*

HPDC, "Plasmonic High-speed Devices for Enhancing the Performance of Microelectronic Devices", Internat'l Search Report for PCT/US2008/011783, filed Oct. 15, 2008. Report issued by Korean Intellectual Property Office, Mar. 31, 2009.

* cited by examiner

PLASMONIC HIGH-SPEED DEVICES FOR ENHANCING THE PERFORMANCE OF MICROELECTRONIC DEVICES

TECHNICAL FIELD

Embodiments of the present invention are directed to photonic devices, and, in particular, to high-speed, plasma-based devices that can be used to enhance the performance of microelectronic devices.

BACKGROUND

In recent years, the increasing density of microelectronic devices on integrated circuits has lead to a technological bottleneck in the density of metallic signal lines that can be used to interconnect these devices. For example, increased signal-line density has led to difficulties with synchronizing the longest communications links between electronic devices and crosstalk between adjacent signal lines. As a result, rather than transmitting information as electrical signals via signal lines, physicists and engineers are investigating materials and devices that can be used to transmit the same information encoded in electromagnetic radiation ("ER") through free space or via waveguides. Transmitting information encoded in ER via waveguides has a number of advantages over transmitting electrical signals via signal lines. First, degradation or loss is much less for ER transmitted via waveguides than for electrical signals transmitted via signal lines. Second, waveguides can be fabricated to support a much higher bandwidth than signal lines. For example, a single Cu or Al wire can only transmit a single electrical signal, while a single optical fiber can be configured to transmit about 100 or more differently encoded ER signals.

Advancements in materials science and semiconductor fabrication techniques have made it possible to develop photonic devices that can be integrated with electronic devices, such as CMOS circuits, to form photonic integrated circuits ("PICs"). The term "photonic" refers to devices that can operate with either classically characterized electromagnetic radiation or quantized electromagnetic radiation with frequencies that span the electromagnetic spectrum. PICs are the photonic equivalent of electronic integrated circuits and may be implemented on a wafer of semiconductor material. In order to effectively implement PICs, passive and active photonic devices are needed. Waveguides and attenuators are examples of passive photonic devices that may be used to direct the propagation of ER between microelectronic devices, and photodetectors are examples of active photonic devices that can be used to encode data in ER, detect data-encoded ER, or control the operation of certain microelectronic device components of a PIC. Most photodetectors are p-n or p-i-n junction semiconductor photodiodes. When a pulse of ER having sufficient energy strikes the photodiode, electron-hole pairs are created. The intrinsic electric field of the photodiode then sweeps the electrons and holes in opposite directions through the junction depletion region producing an electric current that can be used to verify the presence of the incident ER pulse or to control the operation of the microelectronic device. For example, a photodiode in electrical communication with a microelectronic device can be used to turn the device on and off by applying corresponding on and off pulses of electromagnetic radiation. However, photodiodes often have a high capacitance, and may require use of an amplifier which may render them impractical for inclusion in a wide variety of microelectronic devices. Physicists and engineers have recognized a need for photonic devices that can be used to enhance the performance and operation of certain microelectronic devices.

SUMMARY

Various embodiments of the present invention are directed to photonic devices that can be used to collect and convert incident ER into surface plasmons that can be used to enhance the performance and operation of microelectronic devices. In one embodiment of the present invention, a photonic device comprises a dielectric layer having a top surface and a bottom surface, and a planar nanowire network covering at least a portion of the top surface of the dielectric layer. The bottom surface of the dielectric layer is positioned on the top surface of a substrate, and the planar nanowire network is configured to convert incident electromagnetic radiation into surface plasmons that penetrate through the dielectric layer and into at least a portion of the substrate.

BRIEF DESCRIPTION OF THE DRAWINGS

The FIG. 7B shows a cross-sectional view of the second photonic device along a line 7B-7B, shown in FIG. 7A, in accordance with embodiments of the present invention.

DETAILED DESCRIPTION

Figure 1A:
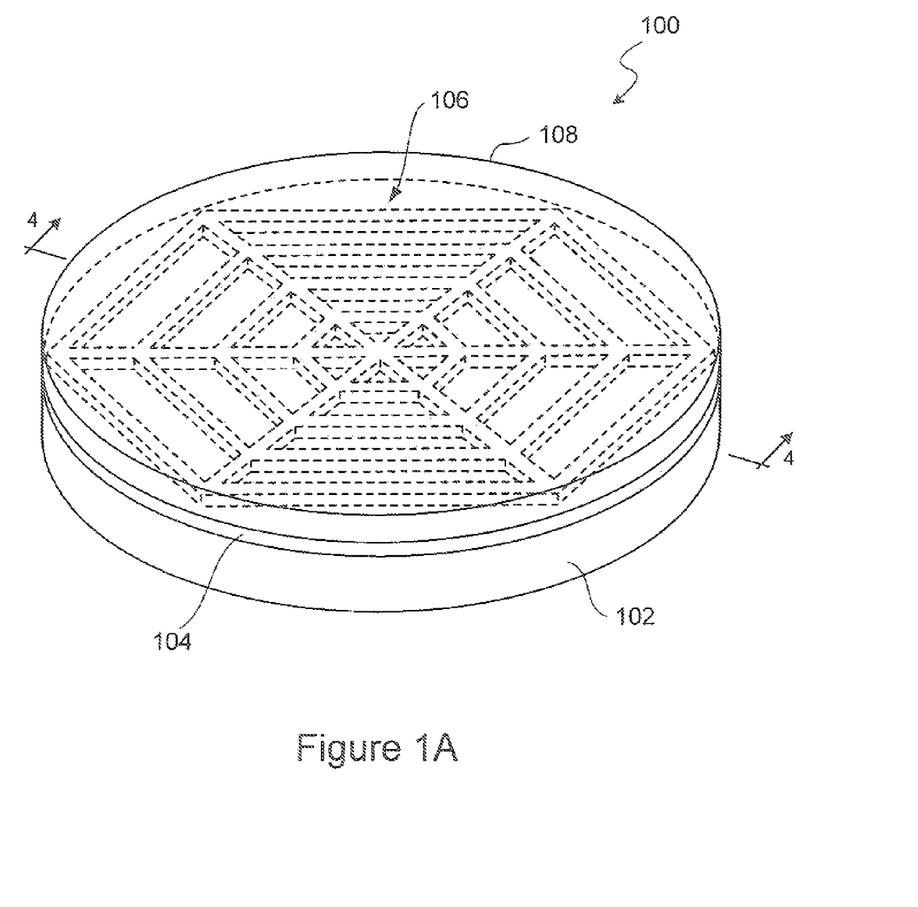
FIG. 1A shows an isometric view of a first photonic device supported by a substrate in accordance with embodiments of the present invention.

Various embodiments of the present invention are directed to photonic devices that can be used to collect and convert incident ER into surface plasmons that can be used to enhance the performance and operation of microelectronic devices. The size of these photonic devices can reduced in one-, two-, and three-dimensions and still retain a relatively large ER capture cross-section. FIG. 1A shows an isometric view of a first photonic device 100 supported by a substrate 102 in accordance with embodiments of the present invention. The photonic device 100 comprises a dielectric layer 104, a planar nanowire network 106 covering at least a portion of the top surface of the dielectric layer 104, and may also include an optional anti-reflective coating 108 that covers surfaces of the planar nanowire network 106 that are not in contact with the substrate 102 and covers portions of the dielectric layer 104 that are not covered by the planar nanowire network 106. The optional anti-reflective coating 108 may improve the efficiency of the photodetector by reducing reflectance of certain wavelengths of incident ER. In particular, in order to reduce the reflectance of incident ER having a wavelength $\lambda$, the anti-reflective coating can be fabricated with a thickness of approximately $\lambda/4$.

Figure 1B:
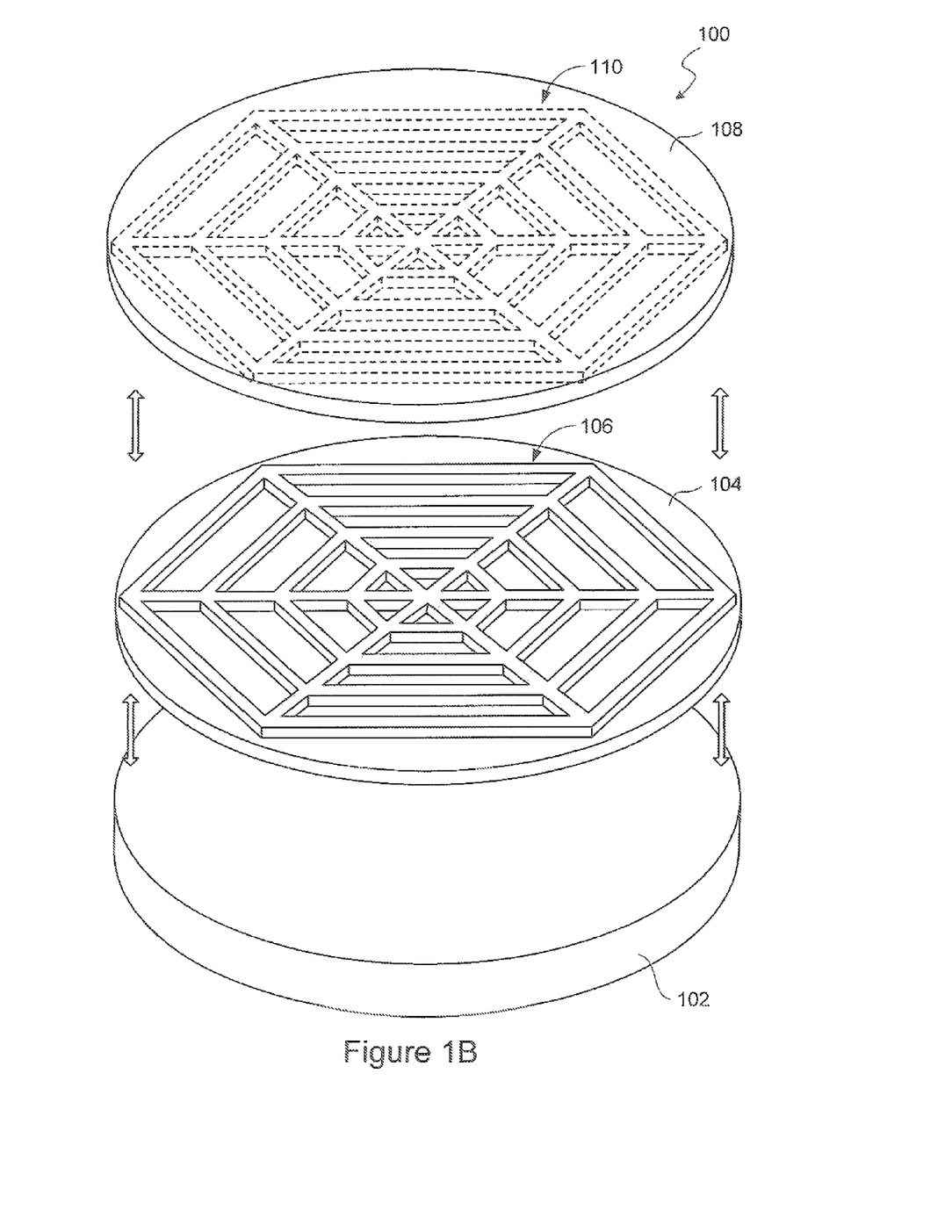
FIG. 1B shows an exploded isometric view of the first photonic device and substrate shown in FIG. 1A in accordance with embodiments of the present invention.

FIG. 1B shows an exploded isometric view of the photonic device 100 and the substrate 102, shown in FIG. 1A, in accordance with embodiments of the present invention. The dielectric layer 104 is shown separated from the substrate 102, and the anti-reflective coating 108. FIG. 1B also reveals an impression 110 of the planar nanowire network 106 within the anti-reflective coating 108 and shows that the anti-reflective coating 108 fills regions between nanowires of the planar nanowire network 106.

Figure 2:
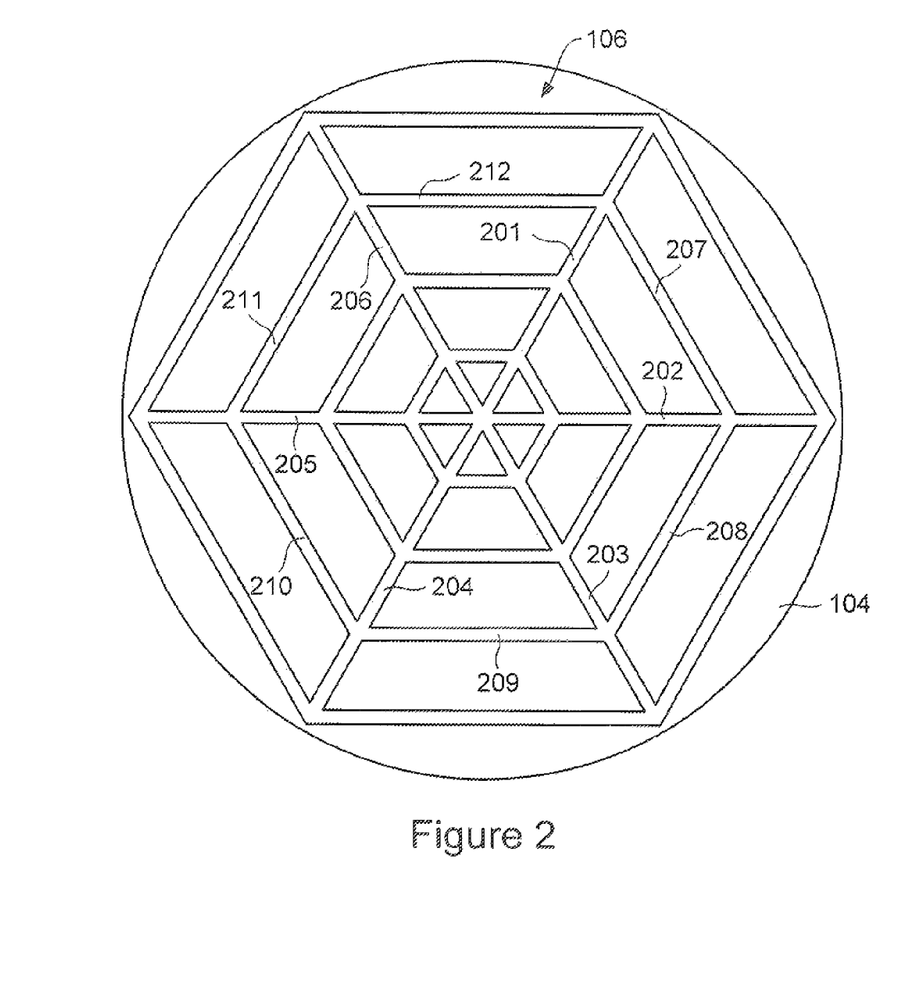
FIG. 2 shows a top view of a hexagonal, planar nanowire network supported by a dielectric layer in accordance with embodiments of the present invention.

FIG. 2 shows a top view of the planar nanowire network 106 supported by the dielectric layer 104 in accordance with embodiments of the present invention. The planar nanowire work 106 comprises six approximately evenly spaced radial nanowires 201-206 radiating outward from the center of the planar nanowire network 106. Each pair of radial nanowires are interconnected by four approximately parallel transverse nanowires, and the transverse nanowires are configured to form four concentric nanowire hexagons, where each radial nanowire intersects a vertex of each of the nanowire hexagons 201-206. For example, a transverse nanowire 207 interconnects radial nanowires 201 and 202, transverse nanowires 207-212 form one of the four concentric nanowire hexagons, and the radial nanowire 201 intersects a vertex of each of the four concentric nanowire hexagons.

Figure 3A:
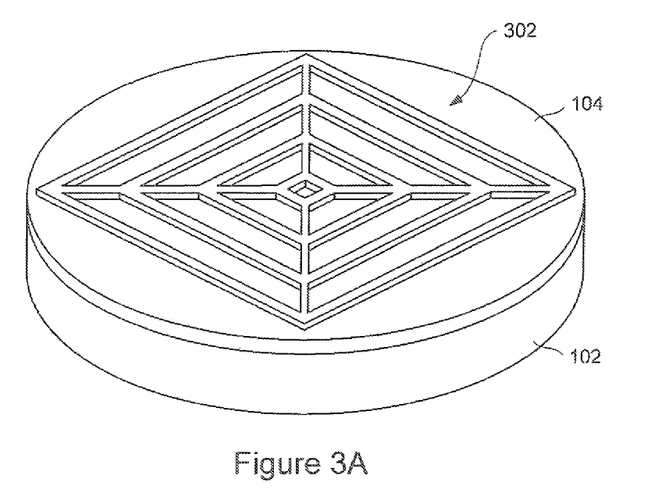
FIG. 3A shows a square, planar nanowire network in accordance with embodiments of the present invention.
Figure 3B:
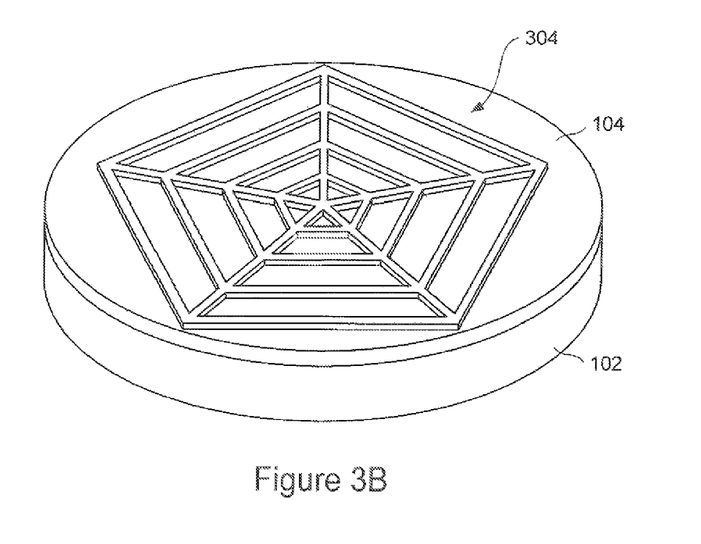
FIG. 3B shows a pentagonal, planar nanowire network in accordance with embodiments of the present invention.

In other embodiments of the present invention, the number of radial nanowires and the angle between adjacent radial nanowires can be varied in order to configure a variety of regularly shaped planar nanowire networks. For example, in accordance with embodiments of the present invention, FIG. 3A shows a square, planar nanowire network 302 formed from four approximately evenly spaced radial nanowires, and FIG. 3B shows a pentagonal planar nanowire network 304 formed from five approximately evenly spaced radial nanowires. Also, in other embodiments of the present invention, the angles between adjacent nanowires can be varied to form irregularly shaped planar nanowire networks, and the number of transverse nanowires interconnecting any pair of adjacent radial nanowires can be varied.

Figure 4:
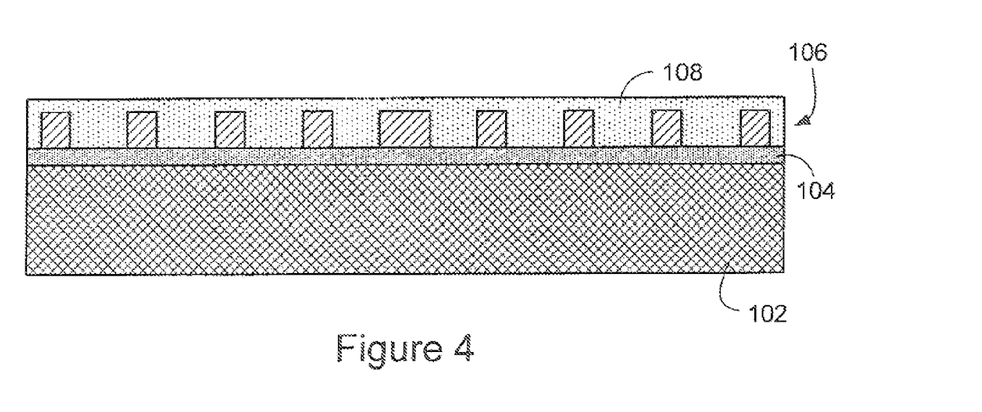
FIG. 4 shows a cross-sectional view of the first photonic device along a line 4-4, shown in FIG. 1, in accordance with embodiments of the present invention.
Figure 5:
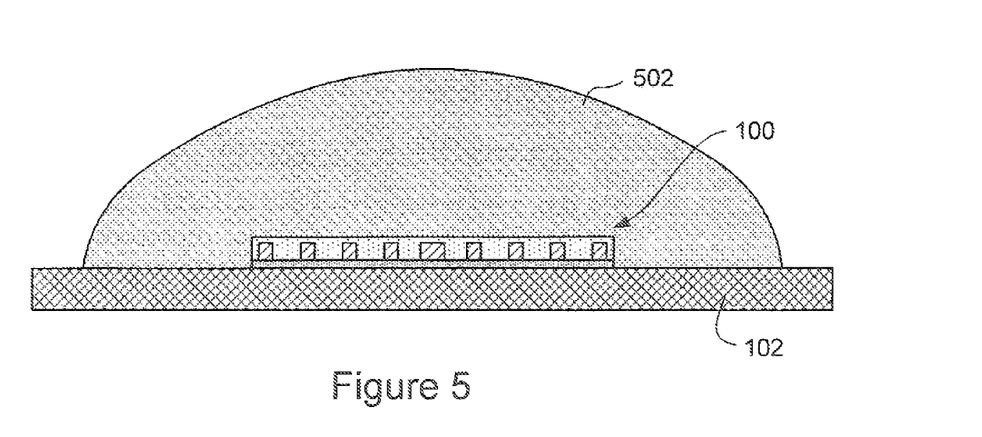
FIG. 5 shows a cross-sectional view of the first photonic device with a lens in accordance with embodiments of the present invention.

FIG. 4 shows a cross-sectional view of the photonic device 100 and the substrate 102 along a line 4-4, shown in FIG. 1, in accordance with embodiments of the present invention. As shown in FIG. 4, the optional anti-reflective coating 108 fills the space between nanowire segments of the planar nanowire network 106. In other embodiments of the present invention, a lens can be placed over the top of the photonic device 100 in order to focus electromagnetic radiation that is incident over a larger area onto the photonic device 100. FIG. 5 shows a cross-sectional view of the photonic device 100 with a lens 502 deposited over the photonic device 100 in accordance with embodiments of the present invention. In certain embodiments of the present invention, the lens 502 can be a holographic lens.

Although planar nanowire networks have been shown with individual nanowires segments having rectangular cross sections, as shown in FIGS. 4 and 5, the nanowires of the planar nanowire networks can also have square, circular, elliptical, or more complex cross sections. The nanowire segments of a planar nanowire network may also have many different widths or diameters and aspect rations or eccentricities. The term "nanowire" may refer to wires of planar nanowire networks having sub-microscale wires, microscale wires, wires with larger dimensions, or to wires of planar nanowire networks having mixed cross-sectional dimensions. For example, the transverse nanowires can have nanoscale dimensions while the radial nanowires have microscale dimensions.

Planar nanowire networks can be composed of metallic and semiconductor substances or from combinations of these types of substances, and from other types of substances. For example, a planar nanowire network can be formed from metals including gold, silver, copper, aluminum, titanium, platinum, and an alloy thereof. Planar nanowire networks of the present invention can be fabricated by mechanical nanoimprinting and lithographic techniques. Alternatively, planar nanowire networks can be chemically synthesized and can be deposited in one or more processing steps, including Langmuir-Blodgett processes. Other alternative techniques for fabricating nanowires may also be employed. Thus, a planar nanowire network, as shown in FIG. 1, can be fabricated by any of numerous well-known processes.

The substrate 102 can represent a semiconductor or compound semiconductor device or represent a metal component of a CMOS device, and the photonic device 100 can be used to photonically control or enhance the operation of these devices. For example, the substrate 102 can represent a p-n or p-i-n junction of a photodiode and the photonic device 100 can be use to enhance the operation of the photodiode. The substrate 102 can be the metallic gate of a field-effect transistor or the bottom of a capacitor, and the photonic device can be used to control the operation the field effect-transistor or the capacitor.

Pulses of electromagnetic radiation incident on the photonic device 100 can be used to enhance operation of a device represented by the substrate 102 as follows. The photonic device 100 can be configured so that electromagnetic radiation incident on the planar nanowire network 106 and having a wavelength within a suitable wavelength range is turned into surface plasmons by the nanowire segments of the planar nanowire network 106. Plasmons are modes of ER that correspond to quantized states of electron plasma oscillations in a metal. A surface plasmon is a mode of electron excitation existing on the surface of a metal and has both longitudinal and transverse components. Surface plasmons feature a high density electric field and slow group velocities leading to a substantial increase in the production rate of nearby electron-hole pairs. Surface plasmons make it possible to reduce the size of optoelectronic devices represented by the substrate 102 to sub-wavelength dimensions and yet retain a large effective cross-section of the incident ER. One immediate advantage of reduced physical dimension is a lower intrinsic capacitance which allows the device represented by the substrate 102 to operate faster. When the substrate 102 is the active region of an optoelectronic device, such as the absorption layer of a photodetector or phototransducer, the thickness of the substrate 102 can be reduce to tens of nanometers and still retain the absorption properties of a wavelength thick absorption layer. A thin substrate 102 allows photo-generated carriers (i.e., electrons and holes) to reach their respective electrodes faster, which in turn increases both the internal quantum efficiency and the speed of the device. If the surface plasmons are not absorbed in the underlying devices of substrate 102, after propagating along the nanowire segments of the planar nanowire network, the surface plasmon may be dissipated as heat in the metal or re-radiated into free space upon reaching the edges of the planar nanowire network.

Figure 6A:
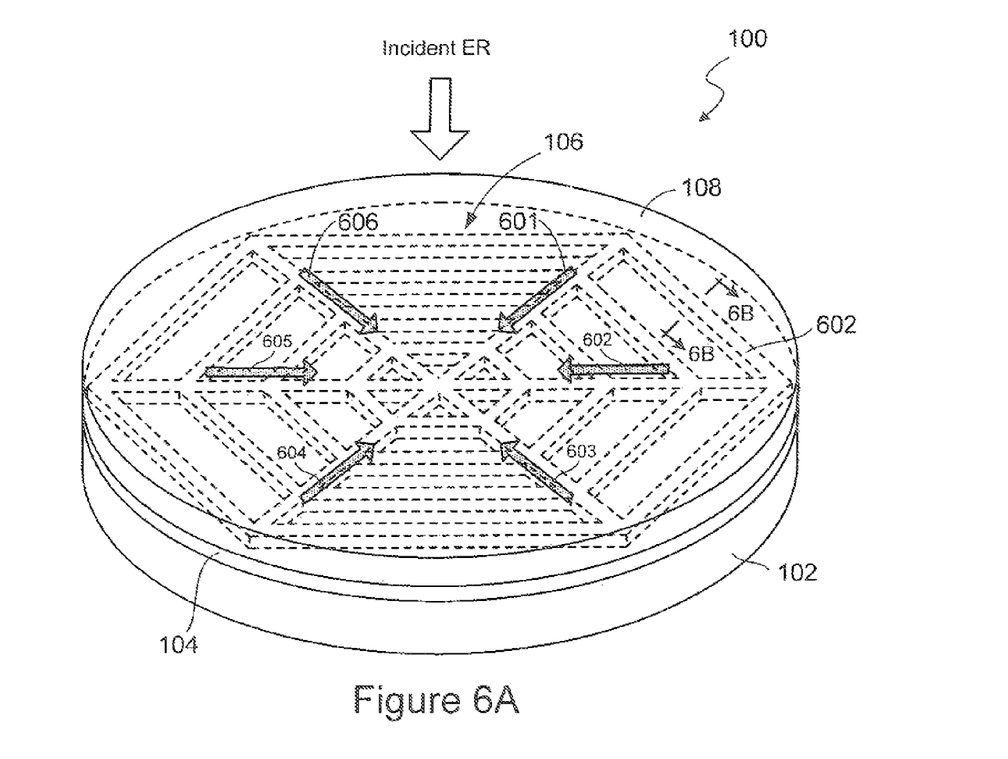
FIG. 6A shows electromagnetic radiation incident on a planar nanowire network of the first photonic device shown in FIG. 1 in accordance with embodiments of the present invention.
Figure 6B:
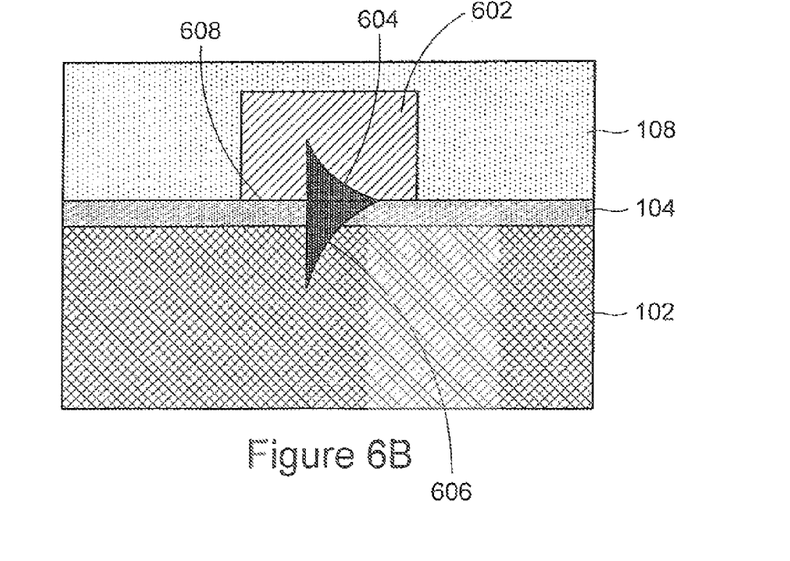
FIG. 6B shows a cross-sectional view of a nanowire of the first photonic device along a line 6B-6B, shown in FIG. 6A, in accordance with embodiments of the present invention.

FIG. 6A shows electromagnetic radiation incident on the planar nanowire network 106 of the photonic device 100 in accordance with embodiments of the present invention. The electromagnetic radiation interacts with the nanowires forming surface plasmons along the interface of the planar nanowire network 106 and the dielectric layer 104. The surface plasmons have both transverse and longitudinal electromagnetic field components. The magnetic field component is parallel to the interface and perpendicular to the propagation direction, while the electric field component is parallel to the direction of the surface plasmon propagation and perpendicular to the interface. FIG. 6B shows a cross-sectional view of a nanowire 602 along a line 6B-6B, shown in FIG. 6A, in accordance with embodiments of the present invention. Curve 604 represents the extent to which the electric field component penetrates into the nanowire 603, and curve 606 represents the extent to which the electric field component penetrates through the dielectric layer 104 and into the substrate 102. Curves 604 and 606 show how the electric field components decay exponentially away from interface 608.

A portion of the surface plasmons formed along the interface of the transverse nanowires propagate to the radial nanowires and then propagate along the radial nanowires toward the center of the planar nanowire network 106, as indicated by the directional arrows 601-606. The surface plasmon intensity can significantly increase toward the center of the planar nanowire network 106 due to a positive interference effect. In other words, a portion of the plasmons created in the segments of the nanowire network add in phase in the center of the network to create a locally intense E-field with associated plasma oscillations. The electric-field penetration into the substrate 102 enhances the amount of and rate at which electron-hole pairs are produced within the substrate 102 below the photonic device 100 with the greatest production occurring beneath the center of the photonic device 100. This increased production level and rate occurring in a small volume of space enhances the operation of a small capacitance photodiode, gate of field-effect transistor, or capacitor represented by the substrate 102.

Figure 7A:
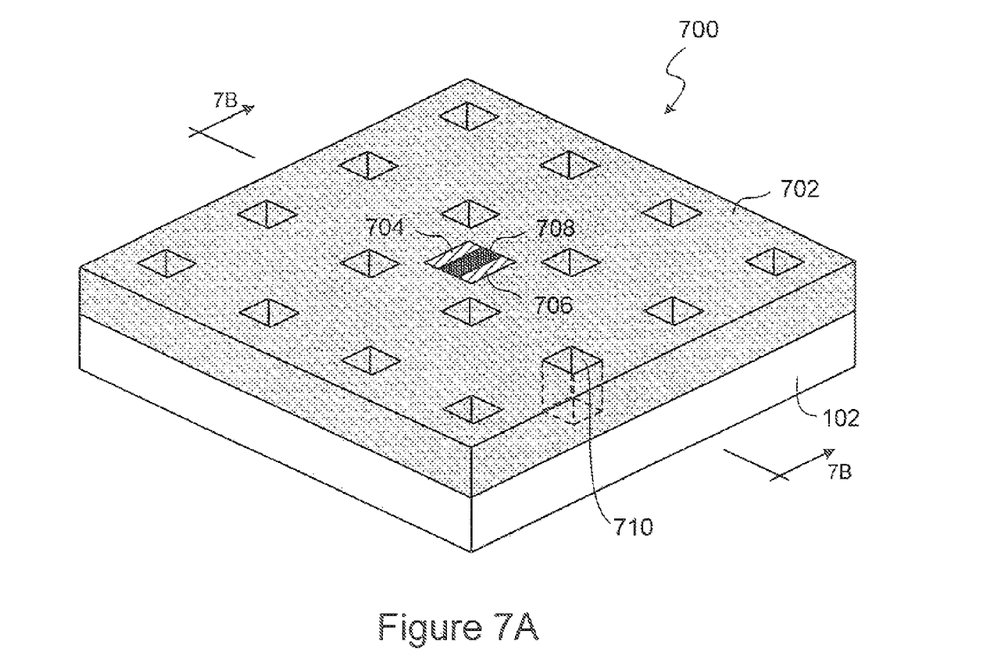
FIG. 7A shows an isometric view of a second photonic device supported by a substrate in accordance with embodiments of the present invention.
Figure 7B:
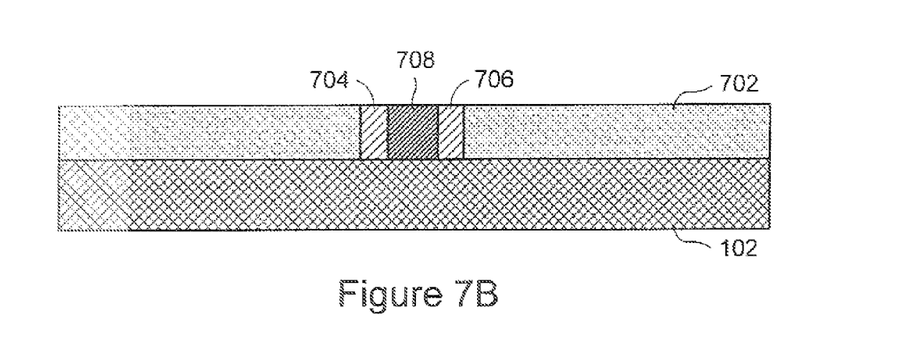

In other embodiments of the present invention, the planar nanowire network, the dielectric layer, and the optional antireflective coating of the photonic device 100 can be replaced by a second dielectric grating with a pair of small metal electrodes located near the center. FIG. 7A shows an isometric view of a second photonic device 700 supported by the substrate 102 in accordance with embodiments of the present invention. The photonic device 700 comprises a photonic grating 702, first and second electrodes 704 and 706, and an ER absorbing material 708 sandwiched between the electrodes 704 and 706. The photonic grating 702 includes a lattice of approximately regularly spaced, square-shaped holes that span the thickness of the photonic grating slab. For example, a hole 710 spans the thickness of the photonic grating slab. The FIG. 7B shows a cross-sectional view of the photonic device 700 along a line 7B-7B, shown in FIG. 7A, in accordance with embodiments of the present invention. As shown in FIG. 7B, the photonic grating 702 is supported by the top surface of the substrate 102, and the electrodes 704 and 706 are configured to span the thickness of the photonic grating 702. Embodiments of the present invention are not limited to square-shaped holes arranged in a square lattice configuration, as shown in FIG. 7. The holes can be rectangular, circular, elliptical, or any other shape and arranged in any two-dimensional lattice configuration that is suitable for trapping and concentrating incident electromagnetic radiation within the photonic grating 702.

The ER absorbing material 708 can be composed of a semiconductor, compound semiconductor, or porous nanomaterials, such as a semiconductor or compound semiconductor infused with $SiO_2$. The electrodes 704 and 706 can be comprised of gold, silver, copper, aluminum, titanium, platinum, an alloy thereof, a semiconductor, a compound semiconductor, or conductive organic materials. The electrodes exhibit a localized plasmon resonance in a desired wavelength range, with an intense electric field component in the gap between the electrodes and the absorbing material 708. The photonic grating 702 can be comprised of a single dielectric, semiconductor, or compound semiconductor. The type of material chosen for a photonic grating may depend on the dimensions and configuration of the photonic grating needed, on the mode parameters associated with an incident beam of electromagnetic radiation, such as the propagating direction $\vec{k}$ and polarization, or on the frequency or wavelength range of the incident electromagnetic radiation. For example, a photonic grating can be comprised of $SiO_2$, $Al_2O_3$, $Si_3N_4$, a dielectric polymer, a semiconductor, a compound semiconductor; or any other suitable material. The compound semiconductors can be binary, ternary, or quaternary II-VI or III-V semiconductor compounds. For example, the photonic grating 702 can be comprised of either ZnTe or CdSe, both II-VI semiconductor compounds, or either GaAs or InP, both III-V semiconductor compounds. A photonic grating can be comprised of two or more layers, wherein each layer may be composed of a different dielectric, semiconductor, or semiconductor compound materials. For example, the photonic grating 702 may be comprised of a single layer of GaAs sandwiched between two layers of AlGaAs.

The photonic grating slab can be formed using molecular beam expitaxy or chemical vapor deposition. The lattice of holes can be formed using one of numerous well-known lithographic and etching techniques. For example, a lattice of holes can be formed in a slab using reactive-ion etching, focused ion-beam milling, chemically assisted ion-beam etching, electron beam lithography, photolithography, and nanoimprint lithography, all of which are well-known in the art and may be selected based on the size and shape of the holes needed and on the slab material. The holes can be air holes or back filled with a dielectric, semiconductor, or semiconductor compound material having a dielectric constant that is different from that of the photonic grating. The holes can be filled with a material using physical or chemical vapor deposition techniques.

In general, the operating mechanism of a photonic grating depends on a guided resonance phenomenon. These guided resonances are strongly confined within the photonic grating slab, and the periodic index contrast created by the lower reflective index holes provides a phase matching mechanism that allows both the coupling of incident light into the confined modes, and the scattering of the guided modes into free space, giving the resonance a finite lifetime. The resonance frequency and lifetime of the guided resonances are determined by the structure of the photonic grating, which provides tremendous flexibility for engineering particular optical properties. The following is a general description regarding the operation of photonic gratings, and electromagnetic radiation incident upon the photonic grating are represented in terms of the electric field component of a single incident electromagnetic wave.

Figure 8:
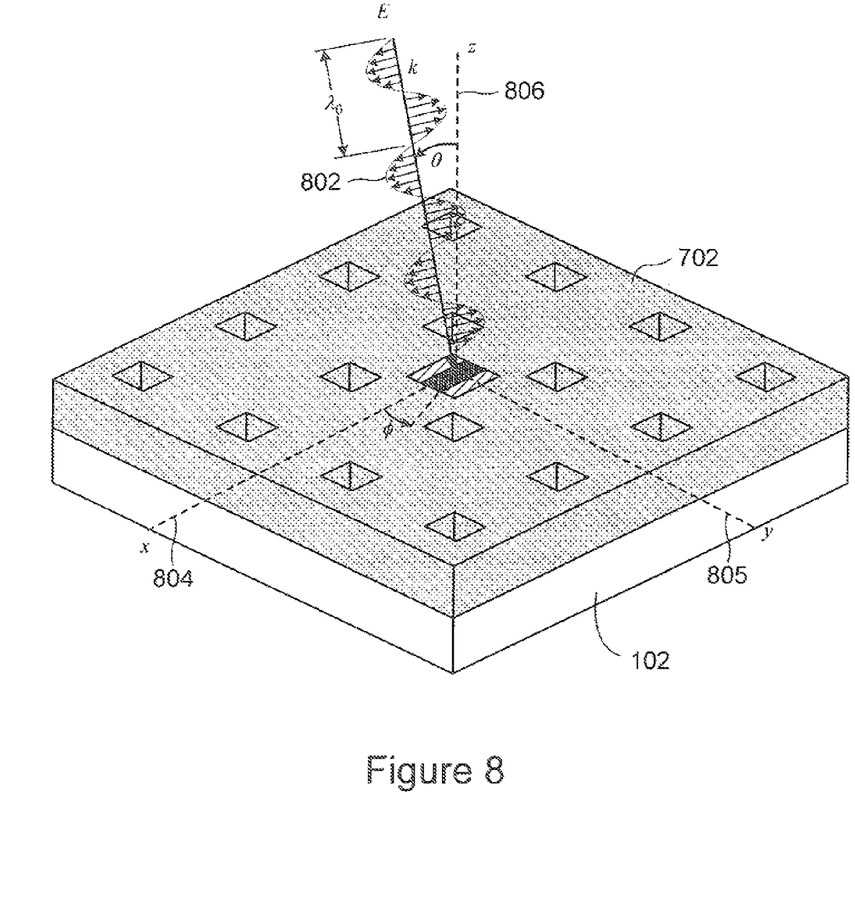
FIG. 8 shows an electric field component of an electromagnetic wave incident upon the second photonic device shown in FIG. 7A in accordance with embodiments of the present invention.

FIG. 8 shows an electric field component of an electromagnetic wave incident upon the photonic grating 702 of the photonic device 700 in accordance with embodiments of the present invention. In FIG. 8, axes 804-806 represent Cartesian coordinate axes $\hat{x}$, $\hat{y}$, and $\hat{z}$, respectively. The electromagnetic wave has an associated wave vector:

$$\vec{k} = k_x \hat{x} + k_y \hat{y} + k_z \hat{z} = k(\sin\theta\cos\phi\hat{x} + \sin\theta\sin\phi\hat{y} + \cos\theta\hat{z})$$

where k is the wave number of the incident electromagnetic wave 802, and the parameters θ and φ are the incident angles of the electromagnetic wave. Incident electromagnetic waves are typically transmitted through the photonic grating 702. However, for each incident electromagnetic wave of a particular polarization and wavelength λ, there is an associated pair of incident angles θ and φ for which the electromagnetic wave is not transmitted through the photonic grating 702. Instead, these electromagnetic waves couple with the photonic grating lattice structure and have a frequency-resonant mode within the xy-plane of photonic grating. When an incident electromagnetic wave is directed normal to the plane of the photonic grating 702 (i.e., the polar angle φ is "0"), changes in the azimuthal angle θ do not affect coupling of the incident electromagnetic wave with the photonic grating. On the other hand, when an incident electromagnetic wave is not directed normal to the plane of the photonic grating 702, there are a large number of incident angles θ and φ for which the photonic grating 702 is transparent to the incident electromagnetic wave 802. For example, consider the electromagnetic wave 802 with a particular polarization and wavelength $\lambda_0$ incident upon the photonic grating 702. Assume that the incident electromagnetic wave 802 has incident angles $\theta_0$ and $\phi_0$ for which the incident electromagnetic wave 802 has a resonance frequency $f_0$ within the xy-plane of the photonic grating 702. Electromagnetic waves having incident angles other than $\phi_0$ and $\phi_0$ are transmitted through the photonic grating 702 The photonic grating 702 serves as a Bragg reflector for the electromagnetic wave, and the photonic grating 702 is not transparent to this electromagnetic wave with wave vector angles $\theta_0$ and $\phi_0$. The electromagnetic wave with wave vector angles $\theta_0$ and $\phi_0$ is absorbed and circulates within the photonic grating 702. This resonance phenomenon is the result of coupling between the incident electromagnetic wave 802 and the electromagnetic radiation modes that can be supported by the photonic grating 702.

The resonance frequency, or resonance, $f_0$ is the frequency at which the electromagnetic wave vibrates with the largest amplitude $A_{max}$ or vibrational energy $E_{max}$ ($\approx A_{max}^2$). The resonance frequency $f_0$ is determined by the dielectric constant $\in$, the lattice constant, the hole width, and the thickness or the photonic grating 702. The quality ("Q") factor is one way to quantitatively assess the sharpness of the resonance of a photonic grating. The Q factor is a measure of how long ER remains trapped in resonance before it is absorbed or radiated away. The Q factor compares the frequency at which a system oscillates to the rate at which the system losses energy. A relatively large Q factor indicates a low rate of energy dissipation relative to the resonance frequency of the system. In general, the Q factor can be represented by:

$$Q \approx \frac{f_0}{\Delta f}$$

where Δf is the range of frequencies for which the vibrational energy of the physical system is at least one-half of the maximum vibrational energy $E_{max}$ at $f_0$.

Returning to operation of the photonic grating 702, incident electromagnetic radiation can be selected with appropriate incident angles and wavelength to form a resonance with the photonic grating 702. This electromagnetic radiation becomes trapped and concentrated within the photonic grating 702, where it has a relatively long period of time to be absorbed by the ER absorbing material 708, where the trapped ER can efficiently excite a gap plasmon between the two metal electrodes 704 and 706 and the absorbing material 708. The electric field component associated with the gap plasmon is very intense in the region between the electrodes 704 and 706 and the absorbing material 708 causing the formation of electron-hole pairs as described above with reference to FIG. 6. The electrons and holes travel only a short distance (~10-50 nm) between the electrodes 704 and 706. Hence the quantum efficiency and the speed of the device should be high.

Figure 9A:
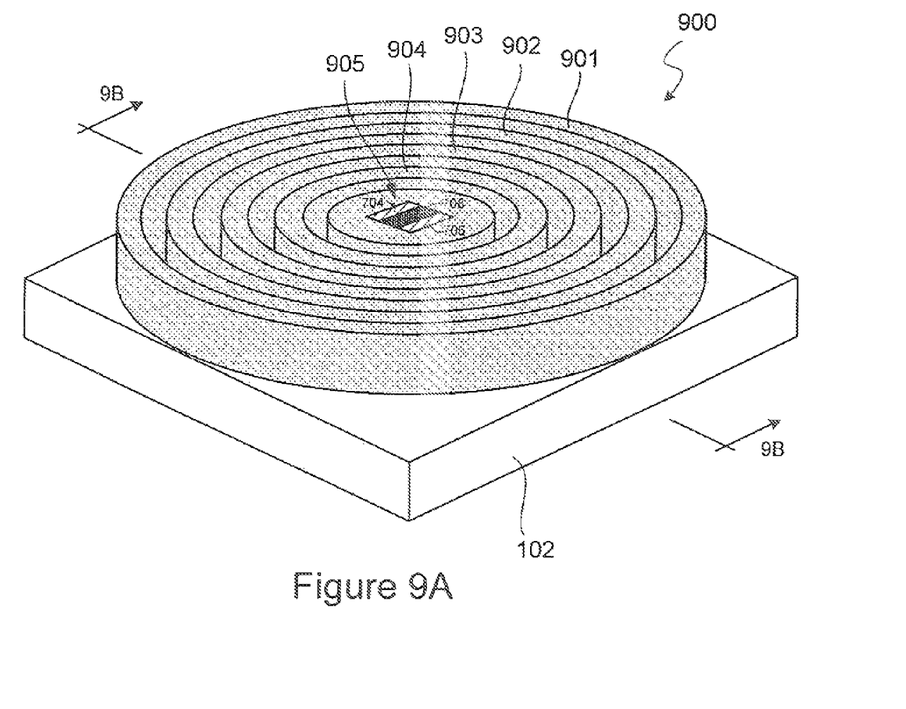
FIG. 9A shows an isometric view of a third photonic device supported by a substrate in accordance with embodiments of the present invention.
Figure 9B:
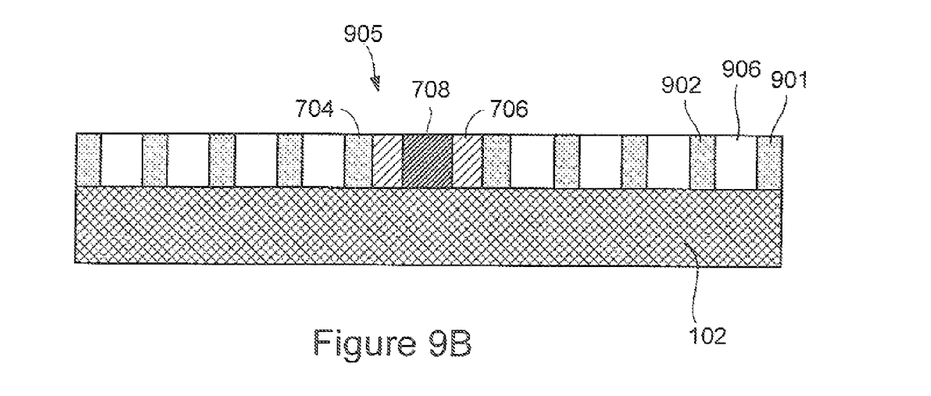
FIG. 9B shows a cross-sectional view of the third photonic device along a line 9B-9B, shown in FIG. 9A, in accordance with embodiments of the present invention.

FIG. 9A shows an isometric view of a third photonic device 900 supported by the substrate 102 in accordance with embodiments of the present invention. The photonic device 900 is comprised of four concentric rings 901-904 and a central region 905 that includes the ER absorbing material 708 sandwiched between the two electrodes 704 and 706. FIG. 9B shows a cross-sectional view of the photonic device 900 along a line 9B-9B, shown in FIG. 9A, in accordance with embodiments of the present invention. FIG. 9B reveals gaps between the concentric rings 901-904, such as a gap 906 between concentric rings 901 and 902. Embodiments of the present invention are not limited to the photonic device 900 having concentric rings 901-904. In other embodiments of the present invention, the concentric ellipses can be used depending on the kind and shape of the photonic device needed.

The photonic device 900 can be comprised of a single dielectric, semiconductor, or semiconductor compound material. The type of material chosen for a photonic grating may depend on the dimensions and configuration of the photonic device needed, on the mode parameters associated with an incident beam of electromagnetic radiation, such as the propagating direction $\vec{k}$ and polarization, or on the frequency or wavelength range of the incident electromagnetic radiation. The photonic device can be formed by first depositing a slab of material using molecular beam expitaxy or chemical vapor deposition. The gaps between concentric rings 901-904 and central region 905 can be formed using one of numerous well-known lithographic and etching techniques. For example, gaps can be formed using reactive-ion etching, focused ion-beam milling, chemically assisted ion-beam etching, electron beam lithography, photolithography, and nanoimprint lithography, all of which are well-known in the art and may be selected based on the size and shape of the holes needed and on the slab material. The gaps can be air gaps or back filled with a dielectric, semiconductor, or compound semiconductor material having a dielectric constant that is different from that of the concentric rings 901-904. The gaps can be filled with a material using physical or chemical vapor deposition techniques.

Incident electromagnetic radiation can be selected with appropriate incident angles and wavelength to form a resonance with the photonic device 900. Like the photonic grating 702, this electromagnetic radiation becomes trapped and concentrated within the photonic device 900. The ER absorbing material 702 aids in the formation of surfaces plasmons on the electrodes 704 and 706. The surface plasmons formed at the interface between the electrodes 704 and 706 and the substrate 102 enhances the formation of electron-hole pairs and in the substrate 102, as described above with reference to FIG. 6.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A photonic device comprising:
a dielectric layer having a top surface and a bottom surface, the bottom surface of the dielectric layer disposed on a surface of a substrate;
a planar nanowire network covering at least a portion of the top surface of the dielectric layer, the planar nanowire network to convert incident electromagnetic radiation into surface plasmons that form between the planar nanowire network and the dielectric layer, and the dielectric layer having a thickness that enables the surface plasmons to penetrate through the dielectric layer and into at least a portion of the substrate;
a number of radial nanowires, each radial nanowire extends outward from a central region of the planar nanowire network; and
a number of transverse nanowires, each transverse nanowire connects two adjacent radial nanowires, wherein the planar nanowire network has radial symmetry.

2. The photonic device of claim 1 further comprises an anti-reflective coating that covers top and side surfaces of the planar nanowire network and at least a portion of the dielectric layer.

3. The photonic device of claim 1 wherein the planar nanowire network further comprises a metal selected from the group consisting of:
gold;
silver;
copper;
aluminum;
titanium;
platinum: and
an alloy thereof.

4. The photonic device of claim 1 wherein the dielectric layer further comprises a dielectric selected from the group consisting of:
$SiO_2$;
$Al_2O_3$;
$Si_3N_4$;
a dielectric polymer: and
any other suitable dielectric material.

5. The photonic device of claim 1 wherein the radial nanowires and the transverse nanowires form an approximately polygonal configuration to convert incident electromagnetic radiation into surface plasmons.

6. The photonic device claim 1 wherein substrate further comprises a capacitor.

7. The photonic device of claim 1 wherein the substrate further comprises a gate of a field effect transistor.

8. The photonic device of claim 1 wherein the substrate further comprises a photodiode.

9. The photonic device of claim 1 wherein the substrate further comprises a phototransducer.

* * * * *

UNITED STATES PATENT AND TRADEMARK OFFICE
CERTIFICATE OF CORRECTION

PATENT NO. : 8,357,980 B2  
APPLICATION NO. : 11/974746  
DATED : January 22, 2013  
INVENTOR(S) : R. Stanley Williams et al.

It is certified that error appears in the above-identified patent and that said Letters Patent is hereby corrected as shown below:

In the Claims

In column 10, line 15, in Claim 3, delete "platinum:" and insert -- platinum; --, therefor.

In column 10, line 21, in Claim 4, delete "$Al_2,O_3$;" and insert -- $Al_2O_3$; --, therefor.

In column 10, line 23, in Claim 4, delete "polymer:" and insert -- polymer; --, therefor.

In column 10, line 29, in Claim 6, delete "device claim" and insert -- device of claim --, therefor.

Signed and Sealed this
Fourteenth Day of May, 2013

Teresa Stanek Rea
*Acting Director of the United States Patent and Trademark Office*